(No Model.)
K. J. BAYER.
PROCESS OF OBTAINING ALUMINA.
No. 382,505. Patented May 8, 1888.
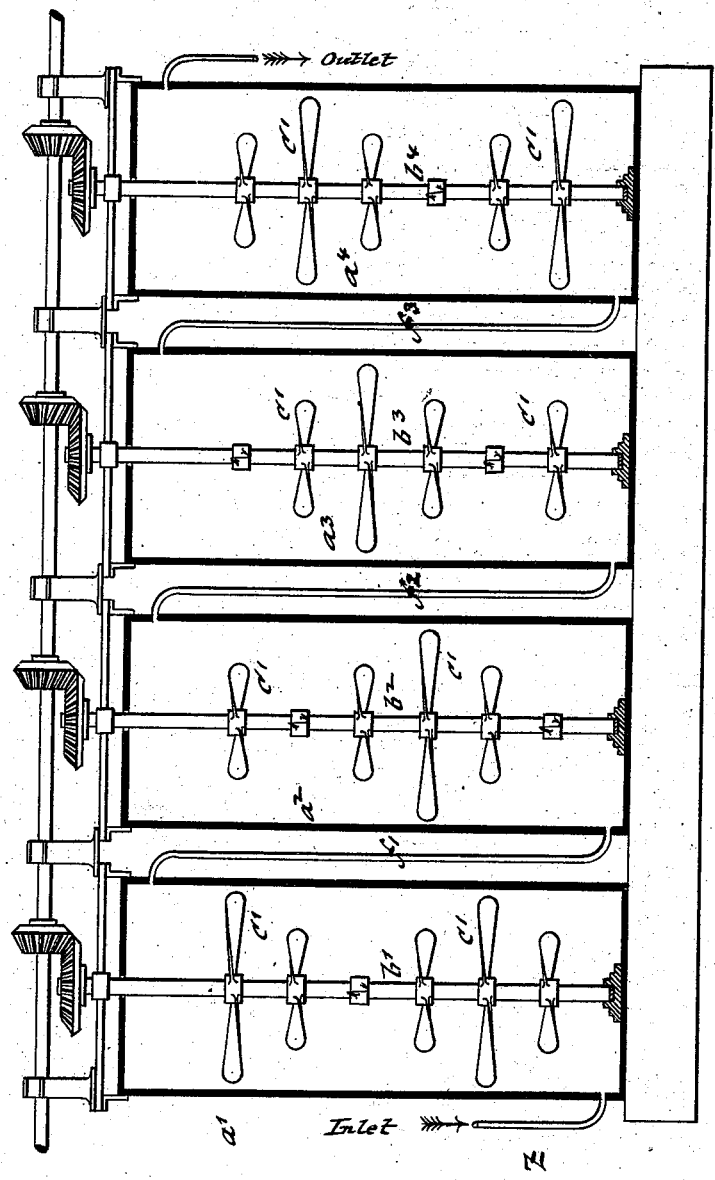
WITNESSES:
INVENTOR,
Karl Josef Bayer.
BY
ATTORNEYS.

UNITED STATES PATENT OFFICE.

KARL JOSEF BAYER, OF ST. PETERSBURG, RUSSIA.

PROCESS OF OBTAINING ALUMINA.

SPECIFICATION forming part of Letters Patent No. 382,505, dated May 8, 1888.

Application filed August 18, 1887. Serial No. 247,258. (No specimens.)

*To all whom it may concern:*

Be it known that I, KARL JOSEF BAYER, a subject of the Emperor of Austria-Hungary, residing at St. Petersburg, in the Empire of Russia, have invented certain new and useful Improvements in the Process of and Apparatus for Obtaining Pure Alumina Compounds from Bauxite and Similar Materials Containing Alumina; and I do declare the following to be a full, clear, and exact description of the invention.

In the manufacture of sulphate of alumina or other compounds of aluminium from bauxite and similar materials by the so-called "alkaline process" heretofore in use, crude aluminate is obtained by calcining the raw material with soda, carbonate of soda, or sulphate of soda, and charcoal. The product of this operation is lixiviated with water, and the aluminate lye thus produced is decomposed by saturating it with carbonic acid when hot, thereby producing a precipitate of hydrate of alumina and a solution of carbonate of soda, which may again be employed for the same process. The precipitated hydrate of alumina is filtered by one of the well-known methods, washed, and further utilized.

My process of obtaining pure alumina compounds from bauxite and other materials containing alumina possesses important advantages over that just described, and is based on the discovery that an aluminate solution formed in the ordinary manner begins to decompose if hydrate of alumina is added while constantly stirring the liquid, and that during certain periods of time this decomposition continues until the ratio between the number of molecules of alumina ($Al_2O_3$) and that of soda ($Na_2O$) is one to six, after which the decomposition ceases.

Supposing the ratio of molecules in the original aluminate lye to be 1 to 1.8, as is usually the case, about three-fourths of the contained alumina will be separated by heating the aluminates with hydrate of alumina, while one-fourth remains in solution. The separated hydrate of alumina, like that which is precipitated by carbonic acid from a hot liquid, forms a crystalline powder, which can be washed very easily, and dissolves easily in sulphuric acid, owing to its uniformity and fine distribution. Compared with the precipitation by carbonic acid, this method offers the advantage that any silicic acid, phosphoric acid, and similar impurities which may occur in the solution are not precipitated with the hydrate of alumina, as is the case with the former method.

For precipitating the hydrate of alumina as completely as possible until the proper ratio or proportion has been reached, the liquid containing it must be cold. This fact occasions a considerable saving of steam or fuel, because it renders unnecessary the heating of the aluminate lye up to nearly the boiling-point. Furthermore, no fuel is required for generating carbonic-acid gas and for supplying the power necessary for forcing the gas through the liquids to be saturated, and the cost of the plant for the manufacture of carbonic acid—such as force-pumps, coke-ovens, or lime-kilns, with the necessary washing apparatus and conducting-pipes—is avoided.

The alkaline solution resulting from the decomposition of the aluminate by my process is separated from the precipitated hydrate of alumina, and subsequently concentrated as much as possible in suitable evaporating appliances, after which it is mixed with the bauxite, boiled down, and calcined. The small quantity of alumina still remaining in the lye will not interfere with the process. This operation also occasions important advantages, as will be seen from the following.

In calcining the bauxite with carbonate of soda the two ingredients should be mixed in such proportions that the sum of the molecules of the sesquioxides ($Al_2O_3$, $F_2O_3$) contained in the bauxite is to the soda of the carbonate of soda, as one to one, or at the most as 1 to 1.2. If more carbonate of soda be taken its carbonic acid will not be completely driven out, and the presence of carbonate in the aluminate solution renders the latter more easily decomposable, and if less carbonate of soda be taken the bauxite will be rendered imperfectly assimilable.

By dissolving in water the mass produced by heating the above-described mixture of carbonate of soda and bauxite a portion of the hydrate of alumina is precipitated, so that under the most favorable circumstances only about seventy-five per cent. of the alumina contained in the bauxite will be utilized. On the other hand, my investigations have shown that by first adding to the water serving to dissolve the calcined mass a quantity of caustic soda equal to about thirty per cent. of the soda contained in the said mass, and subsequently commencing to dissolve, no decomposition takes place, and the whole of the assimilable alumina is obtained in solution.

The advantage of using alkaline lyes obtained by my method of dissociation, for the manufacture of fresh quantities of crude aluminate, are apparent. It is possible to add to the mixture from the beginning a sufficient quantity of soda to insure that, in dissolving, the whole of the alumina remains in solution, for, owing to the absence of carbonate of soda, no carbonic acid need be driven out, and the drawbacks resulting from an excess of carbonate of soda, as indicated above, are avoided. As there is no carbonic acid to be driven out, the mass will be ready in less than half the time which would be required by the former method. In my new process a thorough heating of the mass is sufficient.

The apparatus necessary or suitable for my process is shown in vertical section in the accompanying drawing; and it consists, essentially, of decomposing cylinders or retorts.

A continuous apparatus may, for instance, comprise four large upright cylinders, $a'\ a^2\ a^3\ a^4$, of sheet iron, which are connected with each other by tubes $f'\ f^2\ f^3$ in such a manner that the liquid passes successively from one cylinder to the other, entering every cylinder at the bottom and leaving it at the top. Each cylinder contains a stirrer, consisting of a vertical shaft, $b'\ b^2\ b^3\ b^4$, carrying a series of helical blades, $c'\ c^2\ c^3\ c^4$, of unequal sizes. A constant stream of aluminate solution enters at one end of the battery of cylinders, at the bottom of the first cylinder, through Z, and is discharged at the other end at the top of the last cylinder after having undergone decomposition. Only for starting the operation some hydrate of alumina is introduced into the first cylinder as exciting-liquid, while slowly admitting the liquid to be decomposed, and setting the stirrers in motion from the main driving-shaft, and suitable bevel-gears arranged above the cylinders, as shown in the drawings.

Having thus described my invention, I claim as new and desire to secure by Letters Patent—

The process herein described of obtaining pure alumina compounds from bauxite and other materials containing alumina, which consists in subjecting an aluminate lye under constant stirring and at ordinary temperature to the action of hydrate of alumina, so as to decompose said solution and precipitate hydrate of alumina, concentrating the remaining mother liquor, mixing the resulting product with bauxite or other material containing alumina, and, lastly, calcining the mixture, substantially as set forth.

In testimony whereof I affix my signature in presence of two witnesses.

KARL JOSEF BAYER.

Witnesses:
F. ZAHRANSKY,
C. SIEGFRIED.